US012738072B2

(12) United States Patent
Ham

(10) Patent No.: US 12,738,072 B2
(45) Date of Patent: Sep. 15, 2026

(54) APPARATUS FOR CORRECTING A SURROUNDING IMAGE OF A VEHICLE AND A METHOD THEREOF

(71) Applicants: HYUNDAI MOTOR COMPANY, Seoul (KR); KIA CORPORATION, Seoul (KR)

(72) Inventor: Jeong Hun Ham, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/775,774

(22) Filed: Jul. 17, 2024

(65) Prior Publication Data

US 2025/0191376 A1 Jun. 12, 2025

(30) Foreign Application Priority Data

Dec. 6, 2023 (KR) ........................ 10-2023-0176002

(51) Int. Cl.

| | |
|---|---|
| ***G06V 20/58*** | (2022.01) |
| ***G06F 3/01*** | (2006.01) |
| ***G06T 7/20*** | (2017.01) |
| ***G06V 10/60*** | (2022.01) |
| ***H04N 1/60*** | (2006.01) |

(52) U.S. Cl.

CPC .............. *G06V 20/58* (2022.01); *G06F 3/013* (2013.01); *G06T 7/20* (2013.01); *G06V 10/60* (2022.01); *H04N 1/60* (2013.01); *G06V 2201/07* (2022.01)

(58) Field of Classification Search

CPC .... G06V 20/58; G06V 10/60; G06V 2201/07; G06F 3/013; G06T 7/20

See application file for complete search history.

(56) References Cited

U.S. PATENT DOCUMENTS

| | | | | |
|---|---|---|---|---|
| 8,493,198 | B1 * | 7/2013 | Vasquez | G08G 1/16 340/436 |
| 9,373,046 | B2 * | 6/2016 | Nelson | B60W 50/14 |
| 10,242,567 | B2 * | 3/2019 | Li | G08G 1/07 |
| 10,377,304 | B2 * | 8/2019 | Chan | B60Q 9/00 |
| 10,403,142 | B1 * | 9/2019 | Shuff | G08G 1/095 |
| 10,423,844 | B2 * | 9/2019 | Dai | G06T 19/006 |
| 10,527,849 | B2 * | 1/2020 | Dai | G02B 27/017 |
| 10,565,872 | B2 * | 2/2020 | Chan | G08G 1/164 |
| 10,657,677 | B2 * | 5/2020 | Chan | G06T 11/001 |
| 10,740,938 | B2 * | 8/2020 | Chan | B60K 35/85 |
| 11,587,314 | B2 * | 2/2023 | Kale | G06N 3/088 |
| 11,827,098 | B2 | 11/2023 | Sohn | |
| 11,935,414 | B1 * | 3/2024 | Bond | G01S 17/86 |
| 12,090,850 | B2 * | 9/2024 | Chang | B60K 35/234 |

(Continued)

FOREIGN PATENT DOCUMENTS

KR 20220141020 A 10/2022

*Primary Examiner* — Brian P Yenke

(74) *Attorney, Agent, or Firm* — Lempia Summerfield Katz LLC

(57) ABSTRACT

An apparatus and a method for correcting a surrounding image of a vehicle are disclosed. The apparatus obtains a surrounding image of a vehicle and detects a moving object in the image. The apparatus changes a color of the moving object to a color that a driver is able to perceive when the color of the moving object is a color that the driver is unable to perceive. Thus, driving convenience is provided to people with color vision impairment.

16 Claims, 10 Drawing Sheets

(56) References Cited

U.S. PATENT DOCUMENTS 12,159,077 B2 * 12/2024 Yusa ..................... B60K 35/90
12,252,014 B2 * 3/2025 Shmueli Friedland ..................... B60K 35/81
2004/0212546 A1 * 10/2004 Dixon ................ H04N 21/4854 348/E5.12
2005/0195363 A1 * 9/2005 Sato ...................... A61B 3/032 351/242
2006/0061586 A1 * 3/2006 Brulle-Drews ..... G06F 3/04897 345/594
2008/0170118 A1 * 7/2008 Albertson ............. A61H 3/061 348/46
2009/0201122 A1 * 8/2009 Stobbe ..................... G07C 9/25 340/3.1
2009/0201309 A1 * 8/2009 Demos ...................... G06T 5/90 345/589
2011/0229023 A1 * 9/2011 Jones .................... G06T 11/001 382/162
2015/0279022 A1 * 10/2015 Shuster ................ H04N 13/332 345/427
2015/0379362 A1 * 12/2015 Calmes ..................... G06T 7/20 348/136
2016/0070965 A1 * 3/2016 Nelson .................. G06V 20/58 382/104
2017/0060234 A1 * 3/2017 Sung ..................... G06F 3/1423
2018/0086346 A1 * 3/2018 Fujisawa ................. B60R 16/02
2019/0031085 A1 * 1/2019 Ba .......................... B60Q 1/085
2019/0095729 A1 * 3/2019 Dai ...................... G06T 11/001
2019/0168668 A1 * 6/2019 Chan ........................ B60Q 9/00
2019/0172229 A1 * 6/2019 Chan ...................... G06V 10/56
2019/0172234 A1 * 6/2019 Chan .................... G08G 1/0962
2019/0230252 A1 * 7/2019 Ito ...................... H04N 1/00129
2019/0378449 A1 * 12/2019 VanderWel .......... G09G 3/2003
2020/0057487 A1 * 2/2020 Sicconi ................... G06F 3/011
2021/0319219 A1 * 10/2021 Kale ..................... G06T 7/0012
2022/0324324 A1 10/2022 Sohn
2022/0366131 A1 * 11/2022 Ekron ..................... G06F 9/453
2023/0169734 A1 * 6/2023 Alexander ............ G06T 19/006 345/633
2023/0296906 A1 * 9/2023 Hsiao .................. G02B 27/026 345/7
2024/0157791 A1 * 5/2024 Shmueli Friedland ..................... B60K 35/65
2024/0259519 A1 * 8/2024 Machado ............... G06V 20/56
2025/0037602 A1 * 1/2025 Yasuda .................. G09B 9/042

* cited by examiner

APPARATUS FOR CORRECTING A SURROUNDING IMAGE OF A VEHICLE AND A METHOD THEREOF

CROSS-REFERENCE TO RELATED APPLICATION

This application claims the benefit of and priority to Korean Patent Application No. 10-2023-0176002, filed in the Korean Intellectual Property Office on Dec. 6, 2023, the entire contents of which are incorporated herein by reference.

TECHNICAL FIELD

The present disclosure relates to a technology for correcting a surrounding image of a vehicle to provide driving convenience to a driver with color vision impairment.

BACKGROUND

Generally, the retina of the human eye includes cone cells that detect color in a bright place and rod cells that recognize faint light in a dark place. In this case, cone cells distinguish colors by detecting red, green, and blue wavelengths. When the retina or optic nerve is damaged, color vision abnormality (dyschromatopsia) occurs in which cone cells cannot distinguish colors normally.

Such color vision abnormality may be classified into color blindness, which is an inability to distinguish colors due to abnormalities in the retina's visual cells, and color weakness where the ability to distinguish colors is lower than that of normal people, making it difficult to distinguish low-saturated colors.

Color blindness may be classified into total color blindness, which cannot distinguish between all colors, red-green color blindness, which cannot distinguish between red and green, and blue-yellow color blindness, which cannot distinguish between blue and yellow. The color weakness may be classified into panchromacy, which has difficulty distinguishing all colors, red-green weakness, which has difficulty distinguishing between red and green, and blue-yellow color weakness, which has difficulty distinguishing between blue and yellow.

Meanwhile, the driver of a vehicle mainly obtains information through vision. In particular, traffic lights transmit information through red, yellow, and green color signals, so people with color vision impairment who cannot recognize any one of red, yellow, and green colors may not obtain a driver's license. However, even when it is impossible to recognize any one of red, yellow, and green, it is possible to exceptionally obtain a driver license when it is possible to distinguish between red, yellow, and green.

For example, a person with color vision impairment may obtain a driver license when the person recognizes the color order of a traffic light and recognizes the changing state of a traffic light, such as a state in which the green light of the traffic light turns off and the yellow light turns on, a state in which the yellow light turns off and the red light turns on, and a state in which the red light turns off and the green light turns on.

Although people with color vision impairment can drive a vehicle, because they cannot perceive any one of red, yellow, and green, they may experience greater driving fatigue and lower driving safety compared to normal people.

This is applied not only to distinguishing traffic lights but also to the process by which people with color vision impairment check surrounding images (e.g., digital side mirror (DSM) images, surround view monitor (SVM) images, and the like) photographed by a camera installed in a vehicle, so there is a need to provide a scheme capable of providing driving convenience to people with color vision impairment.

The subject matter described in this background section is intended to promote an understanding of the background of the disclosure and may include subject matter that is not already known to those of ordinary skill in the art.

SUMMARY

The present disclosure has been made to solve the above-mentioned problems occurring in the prior art while advantages achieved by the prior art are maintained intact.

Aspects of the present disclosure provides an apparatus and a method for correcting a surrounding image of a vehicle capable of providing driving convenience to people with color vision impairment. The apparatus and the method do so by obtaining a surrounding image of a vehicle, detecting a moving object in the image, and changing a color of the moving object to a color that a driver with color vision impairment is able to perceive when the color of the moving object is a color that the driver with color vision impairment is unable to perceive.

Other aspects of the present disclosure provide an apparatus and a method for correcting a surrounding image of a vehicle capable of providing driving convenience to people with color vision impairment by obtaining weather information around the vehicle. The apparatus and the method obtain a surrounding image of the vehicle when it rains, snows, or fogs around the vehicle and detect a moving object in the image. The apparatus and the method change a color of the moving object to a color that a driver is able to perceive when the color of the moving object is a color that the driver is unable to perceive.

Still other aspects of the present disclosure provide an apparatus and a method for correcting a surrounding image of a vehicle capable of providing driving convenience to people with color vision impairment by measuring illuminance around the vehicle. The apparatus and the method obtain a surrounding image of the vehicle when the illuminance does not exceed a threshold and detect a moving object in the image. The apparatus and the method may change a color of the moving object to a color that a driver is able to perceive when the color of the moving object is a color that the driver is unable to perceive.

Still other aspects of the present disclosure provide an apparatus and a method for correcting a surrounding image of a vehicle capable of providing driving convenience to people with color vision impairment by obtaining a digital side mirror (DSM) image corresponding to a turn signal of the vehicle when turn signal is obtained. The apparatus and the method detect a moving object in the DSM image and change a color of the moving object to a color that a driver is able to perceive when the color of the moving object is a color that the driver is unable to perceive.

Still other aspects of the present disclosure provide an apparatus and a method for correcting a surrounding image of a vehicle capable of providing driving convenience to people with color vision impairment by obtaining graze information of a driver, obtaining a digital side mirror (DSM) image of the vehicle when the gaze of the driver is directed to a DSM. The apparatus and the method detect a moving object in the DSM image and change a color of the moving object to a color that a driver is able to perceive when the color of the moving object is a color that the driver is unable to perceive.

Still other aspects of the present disclosure provide an apparatus and a method for correcting a surrounding image of a vehicle capable of providing driving convenience to people with color vision impairment by obtaining a surrounding image of the vehicle when a request for activation of the driver convenience mode is received from the driver. The apparatus and the method detect a moving object in the image and change a color of the moving object to a color that a driver is able to perceive when the color of the moving object is a color that the driver is unable to perceive.

Still other aspects of the present disclosure provide an apparatus and a method for correcting a surrounding image of a vehicle capable of providing driving convenience to people with color vision impairment by including an artificial intelligence (AI) model that determines the activation time point of the driver convenience mode. The apparatus and the method obtain a surrounding image of the vehicle when the AI model determines when to activate the driver convenience mode and detect a moving object in the image. The apparatus and the method change a color of the moving object to a color that a driver is able to perceive when the color of the moving object is a color that the driver is unable to perceive.

The technical problems to be solved by the present disclosure are not limited to the aforementioned problems. Any other technical problems not mentioned herein should be clearly understood from the following description by those having ordinary skill in the art to which the present disclosure pertains. Also, it should be understood that the objects and advantages of the present disclosure may be realized by the units and combinations thereof recited in the claims.

According to an aspect of the present disclosure, an apparatus for correcting a surrounding image of a vehicle includes a camera sensor that photographs the surrounding image of the vehicle. The apparatus includes a controller that detects a moving object in the surrounding image. The controller changes a color of the moving object to a color that a driver with color vision impairment is able to perceive when the color of the moving object is a color that the driver with color vision impairment is unable to perceive.

According to an embodiment, the controller may detect a moving object in a digital side mirror (DSM) image corresponding to a turn signal when the turn signal of the vehicle is obtained.

According to an embodiment, the controller may detect a moving object in a digital side mirror (DSM) image toward which a gaze of the driver with color vision impairment is directed when gaze information of the driver with color vision impairment is obtained.

According to an embodiment, the controller may detect a moving object in the surrounding image when it rains, snows, or fogs around the vehicle.

According to an embodiment, the controller may detect a moving object in the surrounding image when illuminance around the vehicle does not exceed a threshold.

According to an embodiment, the controller may detect the moving object in the surrounding image when a request for activation of a driver convenience mode is received from the driver with color vision impairment.

According to an embodiment, the controller may change a color of a border area of the moving object to the color that the driver with color vision impairment is able to perceive.

According to an embodiment, the controller may change a color of an entire area of the moving object to the color that the driver with color vision impairment is able to perceive.

According to an embodiment, the controller may overlap a letter corresponding to the color of the moving object on the moving object in the surrounding image.

According to an embodiment, the controller may overlap an icon corresponding to the color of the moving object on the moving object in the surrounding image.

According to another aspect of the present disclosure, a method of correcting a surrounding image of a vehicle includes photographing, by a camera sensor, the surrounding image of the vehicle. The method includes detecting, by a controller, a moving object in the surrounding image. The method includes changing, by the controller, a color of the moving object to a color that a driver with color vision impairment is able to perceive when the color of the moving object is a color that the driver with color vision impairment is unable to perceive.

According to an embodiment, detecting the moving object may include obtaining, by the controller, a turn signal, and detecting a moving object in a digital side mirror (DSM) image corresponding to the turn signal.

According to an embodiment, detecting the moving object may include obtaining, by the controller, gaze information of the driver with color vision impairment. Detecting the moving object may include determining, by the controller, a digital side mirror (DSM) toward which a gaze of the driver with color vision impairment is directed. Detecting the moving object may include detecting, by the controller, a moving object in a DSM image.

According to an embodiment, detecting the moving object may include obtaining, by the controller, weather information around the vehicle. Detecting the moving object may include detecting, by the controller, a moving object in the surrounding image when it rains, snows, or fogs around the vehicle.

According to an embodiment, detecting the moving object may include measuring, by an illuminance sensor, illuminance around the vehicle. Detecting the moving object may include detecting, by the controller, a moving object in the surrounding image when the illuminance does not exceed a threshold.

According to an embodiment, detecting the moving object may include receiving, by the controller, a request for activation of a driver convenience mode from the driver with color vision impairment. Detecting the moving object may include detecting, by the controller, the moving object in the surrounding image.

According to an embodiment, changing the color of the moving object may include changing, by the controller, a color of a border area of the moving object to the color that the driver with color vision impairment is able to perceive.

According to an embodiment, changing the color of the moving object may include changing, by the controller, a color of an entire area of the moving object to the color that the driver with color vision impairment is able to perceive.

According to an embodiment, changing the color of the moving object may include overlapping, by the controller, a letter corresponding to the color of the moving object on the moving object in the surrounding image.

According to an embodiment, changing the color of the moving object may include overlapping, by the controller, an icon corresponding to the color of the moving object on the moving object in the surrounding image.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
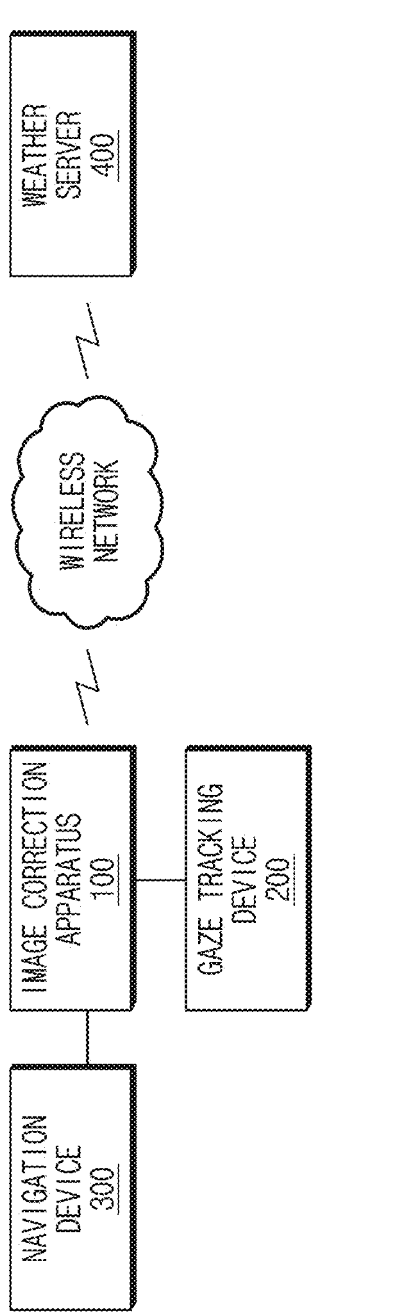
FIG. 1 is a block diagram illustrating a configuration of a system for correcting a surrounding image of a vehicle according to an embodiment of the present disclosure.

Hereinafter, embodiments of the present disclosure are described in detail with reference to the drawings. In adding the reference numerals to the components of each drawing, it should be noted that the identical or equivalent components are designated by the identical numerals even when the components are displayed on other drawings. Further, in describing the embodiments of the present disclosure, a detailed description of the related known configuration or function has been omitted where it has been determined that the detailed description would have interfered with the understanding of the embodiment of the present disclosure.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those having ordinary skill in the art to which the present disclosure pertains. The terms defined in the generally used dictionaries should be construed as having the meanings that coincide with the meanings of the context of the related technologies and should not be construed as ideal or excessively formal meanings unless clearly defined in the specification of the present disclosure. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

FIG. 1 is a block diagram illustrating a configuration of a system for correcting a surrounding image of a vehicle according to an embodiment of the present disclosure.

As shown in FIG. 1, a system for correcting a surrounding image of a vehicle according to an embodiment of the present disclosure may include an image correction apparatus 100, a gaze tracking device 200, a navigation device 300, and a weather server 400. In this case, depending on a scheme of implementing a system for correcting a surrounding image of a vehicle according to an embodiment of the present disclosure, components may be combined with each other to be implemented as one, or some components may be omitted.

Regarding each component, the image correction apparatus 100 may obtain a surrounding image of a vehicle, detect a moving object in the image, and change a color of the moving object to a color that a driver with color vision impairment is able to perceive when the color of the moving object is a color that the driver with color vision impairment is unable to perceive. In other words, the image correction apparatus 100 may operate in a driver convenience mode.

In this case, the image correction apparatus 100 may obtain location information of the vehicle from the navigation device 300. The image correction apparatus 100 may obtain weather information around the vehicle from the weather server 400. The image correction apparatus 100 may operate in a driver convenience mode when the weather around the vehicle is bad (e.g., raining, snowing, fogging, and the like). In this case, the navigation device 300 may be mounted on the vehicle, and the weather server 400 may manage real-time weather information for each region.

In addition, the image correction apparatus 100 may measure illuminance around the vehicle and may operate in the driver convenience mode when the illuminance does not exceed a threshold.

In addition, the image correction apparatus 100 may monitor a turn signal of the vehicle and operate in the driver convenience mode when the turn signal is obtained.

In addition, the image correction apparatus 100 may obtain the gaze information of the driver in conjunction with the gaze tracking device 200. The image correction apparatus 100 may operate in the driver convenience mode when the driver's gaze is directed to a digital side mirror (DSM). In this case, the gaze tracking device 200 may be mounted on a vehicle, and the technology for tracking the driver's gaze is a common technology and is not the subject of the present disclosure.

In addition, the image correction apparatus 100 may operate in the driver convenience mode when a request for activation of the driver convenience mode is received from the driver.

In addition, the image correction apparatus 100 may be equipped with an artificial intelligence (AI) model that determines the activation time point of the driver convenience mode. The image correction apparatus 100 may operate in the driver convenience mode when the activation time point of the driver convenience mode is determined by the AI model.

Meanwhile, the image correction apparatus 100 may detect the boundary line of a moving object in the driver convenience mode and may change the color of the boundary line to a color that the driver is able to perceive.

In addition, the image correction apparatus 100 may display a letter corresponding to the color of the moving object on the moving object in the driver convenience mode.

In addition, the image correction apparatus 100 may display an icon corresponding to the color of the moving object on the moving object in the driver convenience mode.

Figure 2:
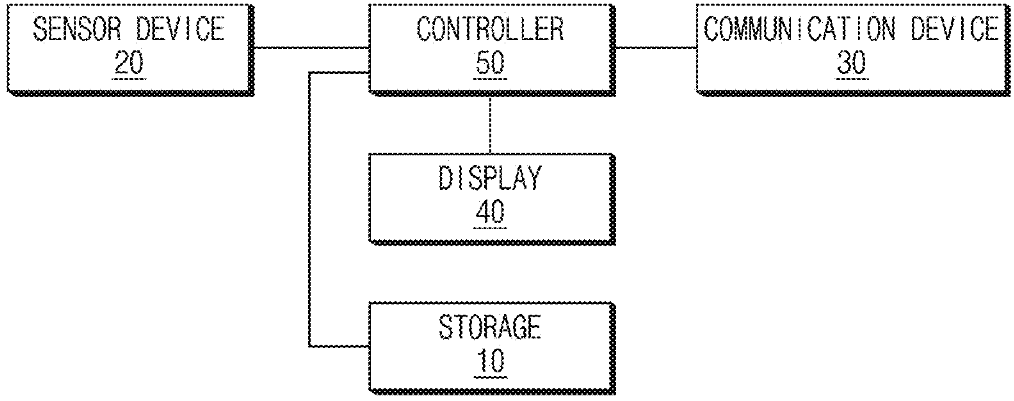
FIG. 2 is a block diagram illustrating a vehicle surrounding image correction apparatus according to an embodiment of the present disclosure.

FIG. 2 is a block diagram illustrating a vehicle surrounding image correction apparatus according to an embodiment of the present disclosure.

As shown in FIG. 2, a vehicle surrounding image correction apparatus 100 according to an embodiment of the present disclosure may include storage 10, a sensor device 20, a communication device 30, and a display 40, and a controller 50. In this case, depending on a scheme of implementing the vehicle surrounding image correction apparatus 100 according to an embodiment of the present disclosure, components may be combined with each other to be implemented as one, or some components may be omitted.

Regarding each component, the storage 10 may store various logic, algorithms, and programs required in the processes of i) obtaining a surrounding image of a vehicle through the sensor device 20, ii) detecting a moving object in the image, and iii) changing a color of the moving object to a color that a driver with color vision impairment is able to perceive when the color of the moving object is a color that the driver with color vision impairment is unable to perceive. In this case, the storage 10 may store imperceptible colors and perceptible colors input from the driver in advance.

The storage 10 may store various logic, algorithms, and programs required in the processes of i) obtaining weather information around the vehicle in conjunction with at least one of the navigation device 300, the weather server 400, or the sensor device 20, ii) obtaining a surrounding image of the vehicle through the sensor device 20 when it rains, snows, or fogs around the vehicle, iii) detecting a moving object in the image, and iv) changing a color of the moving object to a color that a driver is able to perceive when the color of the moving object is a color that the driver is unable to perceive.

The storage 10 may store various logic, algorithms, and programs required in the processes of i) measuring illuminance around the vehicle through the sensor device 20, ii) obtaining a surrounding image of the vehicle when the illuminance does not exceed a threshold, iii) detecting a moving object in the image, and iv) changing a color of the moving object to a color that a driver is able to perceive when the color of the moving object is a color that the driver is unable to perceive.

The storage 10 may store various logic, algorithms, and programs required in the processes of i) obtaining a DSM image corresponding to a turn signal of the vehicle when turn signal is obtained through the sensor device 20, ii) detecting a moving object in the DSM image, and iii) changing a color of the moving object to a color that a driver is able to perceive when the color of the moving object is a color that the driver is unable to perceive.

The storage 10 may store various logic, algorithms, and programs required in the processes of i) obtaining gaze information of the driver in conjunction with the gaze tracking device 200, ii) obtaining a digital side mirror (DSM) image of the vehicle when the gaze of the driver is directed to a digital side mirror (DSM), iii) detecting a moving object in the DSM image, and iv) changing a color of the moving object to a color that a driver is able to perceive when the color of the moving object is a color that the driver is unable to perceive.

The storage 10 may store various logic, algorithms, and programs required in the processes of i) obtaining a surrounding image of the vehicle when a request for activation of the driver convenience mode is received from the driver, ii) detecting a moving object in the image, and iii) changing a color of the moving object to a color that a driver is able to perceive when the color of the moving object is a color that the driver is unable to perceive.

The storage 10 may store various logic, algorithms, and programs required in the processes of i) storing an artificial intelligence (AI) model that determines when to activate the driver convenience mode, ii) obtaining a surrounding image of the vehicle when the AI model determines when to activate the driver convenience mode, iii) detecting a moving object in the image, and iv) changing a color of the moving object to a color that a driver is able to perceive when the color of the moving object is a color that the driver is unable to perceive. In this case, the AI model is a deep learning model that has completed learning.

Figure 3:
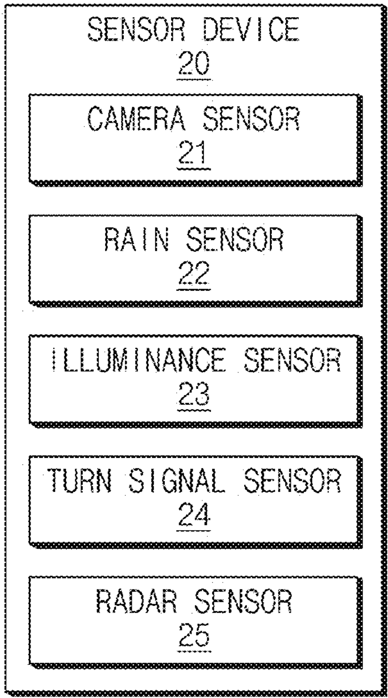
FIG. 3 is a block diagram illustrating the detailed configuration of a sensor device provided in a vehicle surrounding image correction apparatus according to an embodiment of the present disclosure.

The sensor device 20, which refers to a plurality of sensors mounted on the vehicle, and as shown in FIG. 3, may include a camera sensor 21, a rain sensor 22, an illuminance sensor 23, and a turn signal sensor 24, and a radar sensor 25.

In this case, the camera sensor 21, which is a camera that photographs a surrounding image of the vehicle, may include a front camera that photographs the front of the vehicle, a right camera that photographs the right side of the vehicle, a left camera that photographs the left side of the vehicle, and a rear camera that photographs the rear of the vehicle. In addition, the camera sensor 21 may further include a left rear camera that photographs a left DSM image and a right rear camera that photographs a right DSM image.

The rain sensor 22 may be mounted on the vehicle to detect rain.

The illuminance sensor 23 may be mounted on the vehicle to detect illuminance.

The turn signal sensor 24 may be mounted on the vehicle to detect a turn signal. In this case, the turn signal may include a left turn signal and a right turn signal.

The radar sensor 25 may be mounted on the front left, front right, rear left, and rear right sides of the vehicle to detect a surrounding moving object.

The communication device 30, which is a module for providing a communication interface with the weather server 400, may receive weather information of an area where the vehicle is located from the weather server 400. The communication device 30 may include at least one of a mobile communication module, a wireless Internet module, or a short-range communication module.

The mobile communication module may communicate with the weather server 400 through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), and the like).

The wireless Internet module, which is a module for wireless Internet access, may communicate with the weather server 400 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication with the weather server 400 by using at least one of Bluetooth™, radio frequency identification (RFID), infrared data association (IrDA), ultra wideband (UWB), ZigBee, near field communication (NFC), or wireless universal serial bus (USB) technology.

The display 40 may display a surrounding image (DSM images, SVM images, and the like) of the vehicle obtained through the camera sensor 21. In addition, the display 40 may display, under control of the controller 50, an image in which the color of a moving object is changed or an image in which a letter or an icon is overlapped on the moving object.

The controller 50 may be electrically connected to each component and may perform overall control such that each component performs its function normally. The controller 50 may be implemented in the form of hardware or software or may be implemented in a combination of hardware and software. In one example, the controller 50 may be implemented as a microprocessor but is not limited thereto.

The controller 50 may obtain a surrounding image of a vehicle through the camera sensor 21. The controller 50 may detect a moving object in the image. The controller 50 may operate in the driver convenience mode in which the controller 50 changes a color of the moving object to a color that a driver with color vision impairment is able to perceive when the color of the moving object is a color that the driver with color vision impairment is unable to perceive.

In this case, the controller 50 may obtain location information of the vehicle in conjunction with the navigation device 300. The controller 50 may obtain weather information around the vehicle in conjunction with the weather server 400 and the rain sensor 22. The controller 50 may operate in the driver convenience mode when it rains, snows, or fogs around the vehicle.

In addition, the controller 50 may measure illuminance around the vehicle through the illuminance sensor 23 and may operate in the driver convenience mode when the illuminance does not exceed the threshold.

In addition, the controller 50 may obtain a DSM image corresponding to a turn signal of the vehicle when the turn signal is obtained through the turn signal sensor 24. The controller 50 may detect a moving object in the DSM image. The controller 50 may change a color of the moving object to a color that a driver is able to perceive when the color of the moving object is a color that the driver is unable to perceive. In this case, the controller 50 may correct a left DSM image when a left turn signal is obtained. The controller 50 may correct a right DSM image when a right turn signal is obtained.

In addition, the controller 50 may obtain the gaze information of the driver in conjunction with the gaze tracking device 200. The controller 50 may obtain a DSM image of the vehicle when the driver's gaze is directed to a digital side mirror (DSM). The controller 50 may detect a moving object in the DSM image. The controller 50 may change a color of the moving object to a color that a driver is able to perceive when the color of the moving object is a color that the driver is unable to perceive. In this case, the controller 50 may obtain a left DSM image when the driver's gaze with color vision impairment is directed toward the left DSM. The controller 50 may obtain a right DSM image when the driver's gaze is directed toward the right DSM.

In addition, when a request for activation of the driver convenience mode is received from the driver, the controller 50 may operate in the driver convenience mode.

In addition, when the activation time point of the driver convenience mode is determined by the AI model that determines the activation time point of the driver convenience mode, the controller 50 may operate in the driver convenience mode.

Figure 4:
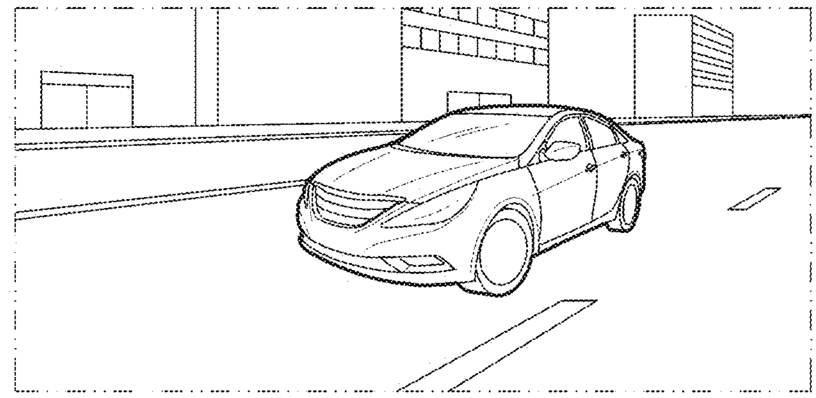
FIG. 4 is a diagram illustrating a first example of a state in which a controller provided in a vehicle surrounding image correction apparatus according to an embodiment of the present disclosure corrects a digital side mirror (DSM) image.

FIG. 4 is a diagram illustrating a first example of a state in which the controller provided in a vehicle surrounding image correction apparatus according to an embodiment of the present disclosure corrects a DSM image.

As shown in FIG. 4, the controller 50 detects a moving object (vehicle) in a DSM image and changes the color of the border area (boundary line) of the moving object to a color that a driver with color vision impairment is able to perceive.

Figure 5:
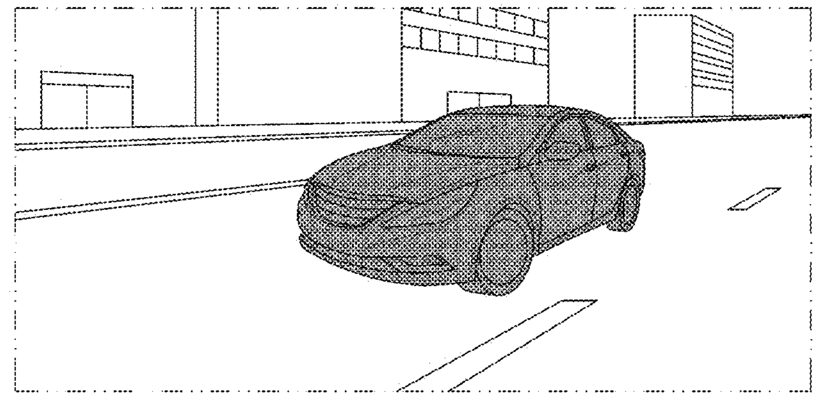
FIG. 5 is a diagram illustrating a second example of a state in which a controller provided in a vehicle surrounding image correction apparatus according to an embodiment of the present disclosure corrects a DSM image.

FIG. 5 is a diagram illustrating a second example of a state in which the controller provided in a vehicle surrounding image correction apparatus according to an embodiment of the present disclosure corrects a DSM image.

As shown in FIG. 5, the controller 50 detects a moving object (vehicle) in a DSM image and changes the color of the entire area of the moving object to a color that a driver with color vision impairment is able to perceive.

Figure 6:
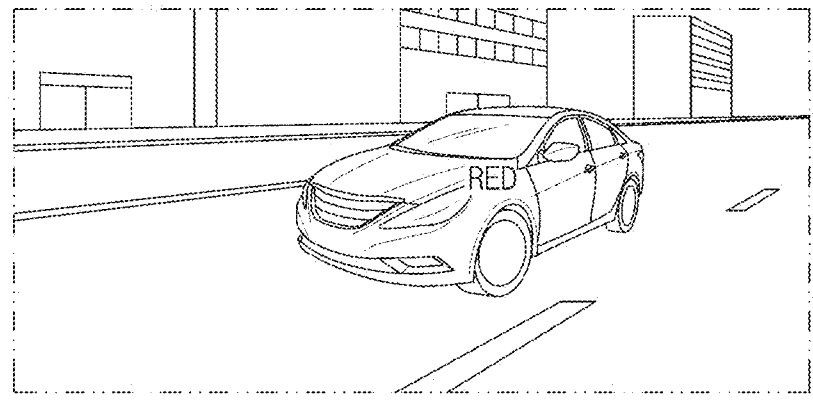
FIG. 6 is a diagram illustrating a third example of a state in which a controller provided in a vehicle surrounding image correction apparatus according to an embodiment of the present disclosure corrects a DSM image.

FIG. 6 is a diagram illustrating a third example of a state in which the controller provided in a vehicle surrounding image correction apparatus according to an embodiment of the present disclosure corrects a DSM image.

As shown in FIG. 6, the controller 50 detects a moving object (vehicle) in a DSM image and controls the display 40 to display letters representing colors by overlapping them on the moving object.

Figure 7:
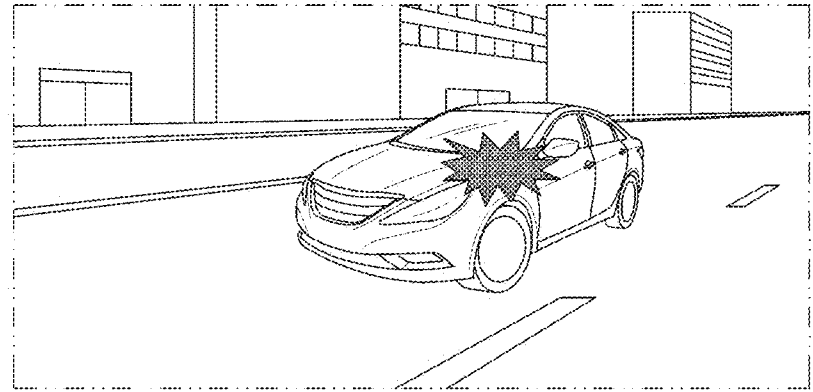
FIG. 7 is a diagram illustrating a fourth example of a state in which a controller provided in a vehicle surrounding image correction apparatus according to an embodiment of the present disclosure corrects a DSM image.

FIG. 7 is a diagram illustrating a fourth example of a state in which the controller provided in a vehicle surrounding image correction apparatus according to an embodiment of the present disclosure corrects a DSM image.

As shown in FIG. 7, the controller 50 detects a moving object (vehicle) in a DSM image and displays an icon corresponding to the moving object by overlapping the icon on the moving object.

Meanwhile, the controller 50 may change a color (RGB pixel value) of each pixel in the surrounding image of the vehicle obtained through the camera sensor 21 to a complementary color.

In addition, the controller 50 may change the surrounding image of the vehicle obtained through the sensor 21 into a black and white image with differences in light and shade.

Figure 8:
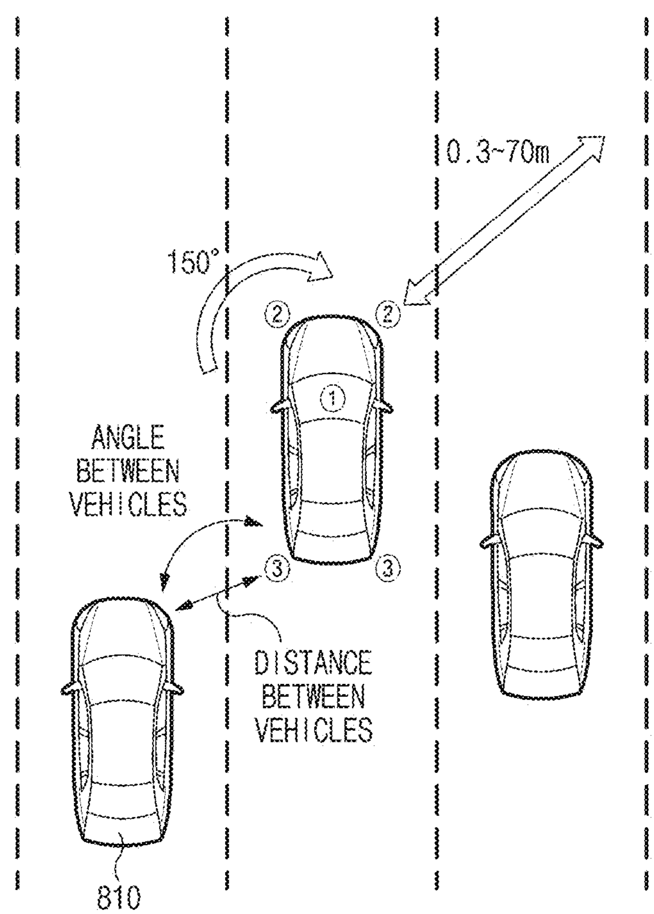
FIG. 8 is a diagram illustrating a process in which a controller provided in a vehicle surrounding image correction apparatus according to an embodiment of the present disclosure detects an area of a moving object in a DSM image.

FIG. 8 is a diagram illustrating a process in which a controller provided in a vehicle surrounding image correction apparatus according to an embodiment of the present disclosure detects an area of a moving object in a DSM image.

As shown in FIG. 8, the controller 50 may detect an area of a moving object within a DSM image by using the camera sensor 21 and the radar sensor 25 without using technology for tracking an object within a DSM image.

As shown in FIG. 8, the controller 50 may recognize a lane based on the front camera ①. In addition, the controller 50 may include a front-side radar ② and a rear-side radar ③. The controller 50 may obtain the distance between vehicles 810, the angle between the vehicles 810, the type of the vehicle 810, and the size of the vehicle 810 based on the rear-side radar ③. Accordingly, the controller 50 may detect the area of the moving object within the DSM image. For example, the measurement distances of the front-side radar ② and the rear-side radar ③ are 0.3 m to 70 m, the relative speed is −45 m/s to +45 m/s, and the horizontal field of view is 150 degrees.

Figure 9:
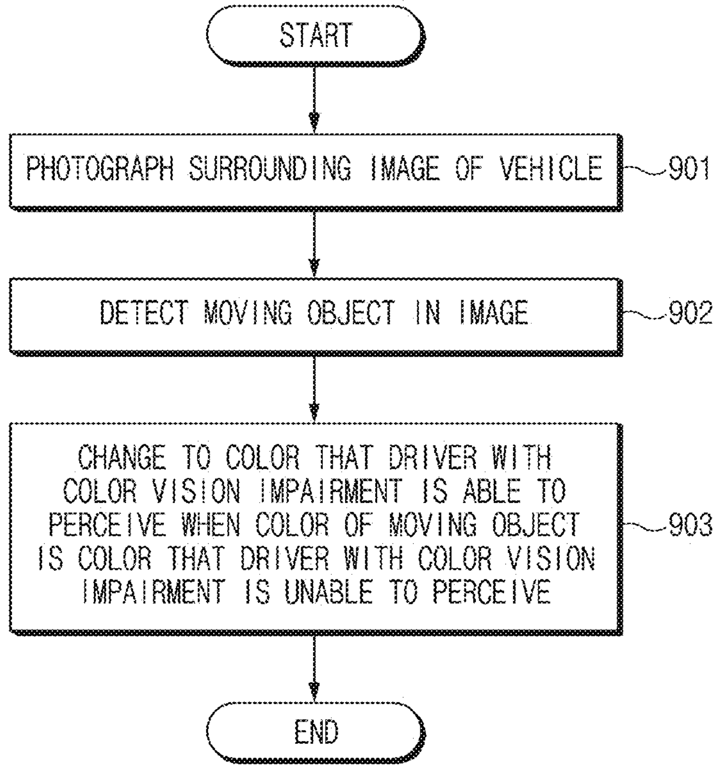
FIG. 9 is a flowchart illustrating a method of correcting a surrounding image of a vehicle according to an embodiment of the present disclosure.

FIG. 9 is a flowchart illustrating a method of correcting a surrounding image of a vehicle according to an embodiment of the present disclosure.

First, the camera sensor 21 photographs a surrounding image of a vehicle in 901.

Then, the controller 50 detects a moving object in the image in 902.

Then, when the color of the moving object is a color that the driver with color vision impairment is unable to perceive, the controller changes the color to a color that the driver with color vision impairment is able to perceive in 903.

Figure 10:
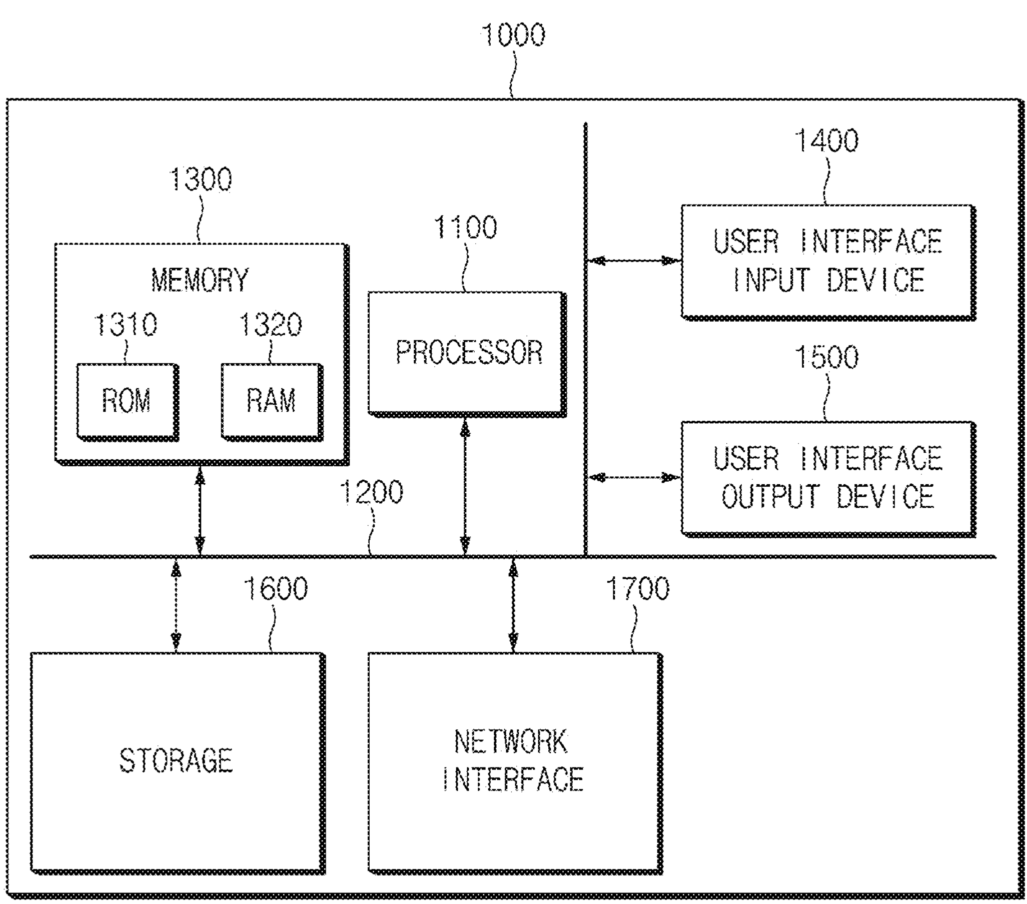
FIG. 10 is a block diagram illustrating a computing system for executing a method of correcting a surrounding image of a vehicle according to each embodiment of the present disclosure.

FIG. 10 is a block diagram illustrating a computing system for executing a method of correcting a surrounding image of a vehicle according to each embodiment of the present disclosure.

Referring to FIG. 10, a method of correcting a surrounding image of a vehicle according to an embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to the embodiments of the present disclosure, it is possible to provide driving convenience to people with color vision impairment by obtaining a surrounding image of a vehicle, detecting a moving object in the image, and changing the color to a color that a driver with color vision impairment is able to perceive when the color of the moving object is a color that the driver is unable to perceive.

Although embodiments of the present disclosure have been described for illustrative purposes, those having ordinary skill in the art should appreciate that various modifications, additions, and substitutions are possible, without departing from the scope and spirit of the disclosure. Therefore, the embodiments disclosed in the present disclosure are provided for the sake of descriptions, without limiting the technical concepts of the present disclosure. It should be understood that such embodiments are not intended to limit the scope of the technical concepts of the present disclosure. The scope of protection of the present disclosure should be understood by the claims below, and all the technical concepts within the equivalent scopes should be interpreted to be within the scope of the right of the present disclosure.

What is claimed is:

1. An apparatus for correcting a surrounding image of a vehicle, the apparatus comprising:

a camera sensor configured to photograph the surrounding image of the vehicle; and a controller configured to detect a moving object in the surrounding image, and change a color of the moving object to a color that a driver with color vision impairment is able to perceive when the color of the moving object is a color that the driver with color vision impairment is unable to perceive, wherein the change of the color of the moving object is based on imperceptible colors and perceptible colors pre-stored for each driver with color vision impairment, wherein the controller is configured to detect a moving object in a digital side mirror (DSM) image corresponding to a turn signal when the turn signal of the vehicle is obtained, wherein the controller is configured to detect a boundary line of the moving object in the DSM image and change color of a boundary area of the moving object to color that the driver with color vision impairment is able to perceive, and wherein the controller is configured to detect the moving object in the DSM image of a DSM toward which a gaze of the driver with color vision impairment is directed when gaze information of the driver with color vision impairment is obtained.

2. The apparatus of claim 1, wherein the controller is configured to detect a moving object in the surrounding image when it rains, snows, or fogs around the vehicle.

3. The apparatus of claim 1, wherein the controller is configured to detect a moving object in the surrounding image when illuminance around the vehicle does not exceed a threshold.

4. The apparatus of claim 1, wherein the controller is configured to detect the moving object in the surrounding image when a request for activation of a driver convenience mode is received from the driver with color vision impairment.

5. The apparatus of claim 1, wherein the controller is configured to change a color of a border area of the moving object to the color that the driver with color vision impairment is able to perceive.

6. The apparatus of claim 1, wherein the controller is configured to change a color of an entire area of the moving object to the color that the driver with color vision impairment is able to perceive.

7. The apparatus of claim 1, wherein the controller is configured to overlap a letter corresponding to the color of the moving object on the moving object in the surrounding image.

8. The apparatus of claim 1, wherein the controller is configured to overlap an icon corresponding to the color of the moving object on the moving object in the surrounding image.

9. A method of correcting a surrounding image of a vehicle, the method comprising:

photographing, by a camera sensor, the surrounding image of the vehicle;

detecting, by a controller, a moving object in the surrounding image; and changing, by the controller, a color of the moving object to a color that a driver with color vision impairment is able to perceive when the color of the moving object is a color that the driver with color vision impairment is unable to perceive, wherein the change of the color of the moving object is based on imperceptible colors and perceptible colors pre-stored for each driver with color vision impairment, and wherein detecting the moving object includes:

obtaining, by the controller, a turn signal;

detecting a moving object in a digital side mirror (DSM) image corresponding to the turn signal;

detecting, by the controller, a boundary line of the moving object in the DSM image, and changing, by the controller, color of a boundary area of the moving object to a color that the driver with color vision impairment is able to perceive;

obtaining, by the controller, gaze information of the driver with color vision impairment; and determining, by the controller, a DSM toward which a gaze of the driver with color vision impairment is directed, and detecting, by the controller, the moving object in the DSM image of the DSM.

10. The method of claim 9, wherein detecting the moving object includes:

obtaining, by the controller, weather information around the vehicle; and detecting, by the controller, a moving object in the surrounding image when it rains, snows, or fogs around the vehicle.

11. The method of claim 9, wherein detecting the moving object includes:

measuring, by an illuminance sensor, illuminance around the vehicle; and detecting, by the controller, a moving object in the surrounding image when the illuminance does not exceed a threshold.

12. The method of claim 9, wherein detecting the moving object includes:

receiving, by the controller, a request for activation of a driver convenience mode from the driver with color vision impairment; and detecting, by the controller, the moving object in the surrounding image.

13. The method of claim 9, wherein changing the color of the moving object includes changing, by the controller, a color of a border area of the moving object to the color that the driver with color vision impairment is able to perceive.

14. The method of claim 9, wherein changing the color of the moving object includes changing, by the controller, a color of an entire area of the moving object to the color that the driver with color vision impairment is able to perceive.

15. The method of claim 9, wherein changing the color of the moving object includes overlapping, by the controller, a letter corresponding to the color of the moving object on the moving object in the surrounding image.

16. The method of claim 9, wherein changing the color of the moving object includes overlapping, by the controller, an icon corresponding to the color of the moving object on the moving object in the surrounding image.

* * * * *